(12) United States Patent
Tomokuni et al.

(10) Patent No.: US 12,141,329 B2
(45) Date of Patent: Nov. 12, 2024

(54) INFORMATION PROCESSING APPARATUS AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Kosuke Tomokuni, Kanagawa (JP); Kazumasa Yamaguchi, Kanagawa (JP); Takeru Sakamoto, Kanagawa (JP); Mitsuhiro Hida, Kanagawa (JP); Takefumi Kubota, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 560 days.

(21) Appl. No.: 17/373,722

(22) Filed: Jul. 12, 2021

(65) Prior Publication Data

US 2022/0300660 A1 Sep. 22, 2022

(30) Foreign Application Priority Data

Mar. 22, 2021 (JP) ................................ 2021-047980

(51) Int. Cl.
*G06F 21/62* (2013.01)
*G06F 21/64* (2013.01)
*H04L 9/32* (2006.01)

(52) U.S. Cl.
CPC ........ *G06F 21/645* (2013.01); *G06F 21/6272* (2013.01); *H04L 9/3247* (2013.01)

(58) Field of Classification Search
CPC .... G06F 21/645; G06F 21/6272; G06F 21/62; H04L 9/3247; H04L 63/10; H04L 63/102
See application file for complete search history.

(56) References Cited

U.S. PATENT DOCUMENTS 7,178,024 B2 * 2/2007 Winkler ............... G06Q 20/382
713/180
2009/0292786 A1 11/2009 McCabe et al.
(Continued)

FOREIGN PATENT DOCUMENTS

| JP | 2002099843 | 4/2002 |
|---|---|---|
| JP | 2016004300 | 1/2016 |
| JP | 6220736 | 10/2017 |

OTHER PUBLICATIONS

"Search Report of Europe Counterpart Application", issued on Feb. 11, 2022, p. 1-p. 8.

*Primary Examiner* — Malcolm Cribbs
(74) *Attorney, Agent, or Firm* — JCIPRNET

(57) ABSTRACT

An information processing apparatus includes a processor configured to use authentication information of a first user who is registered in plural electronic signature services and uses the electronic signature services, to acquire at least one of contract information regarding a contract using each electronic signature service or service information, from each electronic signature service, the authentication information being provided for each of the electronic signature services and used for using the electronic signature service, and the service information being information regarding each electronic signature service, display a check screen in association with the acquired at least one of the contract information or the service information and the electronic signature service as an acquisition source, the check screen being used for checking the plural electronic signature services, and receive selection of the electronic signature service used by the first user on the check screen.

15 Claims, 13 Drawing Sheets

(56) References Cited

U.S. PATENT DOCUMENTS

2014/0014720 A1* 1/2014 Sarkis, Jr. .............. G16H 40/63
235/382
2019/0097811 A1 3/2019 Devoret et al.

* cited by examiner

FIG. 7

| NUMBER | CONTRACT NUMBER | CONTRACT REQUESTING DESTINATION | CONTRACT DATE | CONTRACT EXPIRATION | STATUS | CONTRACT DOCUMENT | ELECTRONIC SIGNATURE SERVICE | ACTION | RELATED CONTRACT |
|---|---|---|---|---|---|---|---|---|---|
| 1 | 100 | B COMPANY | 04.01.1995 | 04.01.2020 | CONTRACTED | 100.PDF | SERVICE B | RENEWAL OF CONTRACT | – |
| 2 | 101 | C COMPANY | – | 12.31.2030 | IN MIDDLE OF CONTRACT | 101.PDF | SERVICE C | SIGNATURE URGING | – |

FIG. 9

| NUMBER | CONTRACT NUMBER | CONTRACT REQUESTING DESTINATION | CONTRACT DATE | CONTRACT EXPIRATION | STATUS | CONTRACT DOCUMENT | ELECTRONIC SIGNATURE SERVICE | ACTION | RELATED CONTRACT |
|---|---|---|---|---|---|---|---|---|---|
| 1 | 100 | B COMPANY | 04.01.1995 | 04.01.2020 | CONTRACTED | 100.PDF | SERVICE B | RENEWAL OF CONTRACT | - |
| 2 | 101 | C COMPANY | - | 12.31.2030 | IN MIDDLE OF CONTRACT | 101.PDF | SERVICE C | SIGNATURE URGING | - |
| 3 | - | - | - | - | - | - | - | NEW CREATION | - |

~102

■ PLEASE SELECT ELECTRONIC SIGNATURE SERVICE TO BE USED

| SELECTION | ELECTRONIC SIGNATURE SERVICE | REMAINING NUMBER OF USAGES |
|---|---|---|
|  | SERVICE A | 20 |
|  | SERVICE B | 10 |
|  | SERVICE C | 5 |
| - | SERVICE D | 0 |

~104

■ PLEASE SELECT FUNCTION

| SELECTION | FUNCTION |
|---|---|
|  | SIGNATURE URGING FUNCTION |
|  | EXPIRATION MANAGEMENT FUNCTION |

~106

■ PLEASE INPUT CONTRACT REQUESTING DESTINATION ~110
■ PLEASE INPUT CONTRACT EXPIRATION ~110
■ PLEASE ATTACH CONTRACT DOCUMENT

PLEASE DRAG AND DROP FILE HERE ~108

| NUMBER | CONTRACT NUMBER | CONTRACT REQUESTING DESTINATION | CONTRACT DATE | CONTRACT EXPIRATION | STATUS | CONTRACT DOCUMENT | ELECTRONIC SIGNATURE SERVICE | ACTION | RELATED CONTRACT |
|---|---|---|---|---|---|---|---|---|---|
| 1 | 100 | B COMPANY | 04.01.1995 | 04.01.2020 | CONTRACTED | 100.PDF | SERVICE B | RENEWAL OF CONTRACT | - |
| 2 | 101 | C COMPANY | - | 12.31.2030 | IN MIDDLE OF CONTRACT | 101.PDF | SERVICE C | SIGNATURE URGING | - |
| 3 | - | NOT SELECTED | - | 01.01.2025 | - | 200.PDF | SERVICE A | EDIT | - |
| 4 | - | D COMPANY | - | 01.01.2025 | - | 201.PDF | NOT SELECTED | EDIT | - |
| 5 | - | NOT SELECTED | - | NOT WRITTEN | - | NOT WRITTEN | NOT SELECTED | NEW CREATION | - |

*104

| SELECTION | ELECTRONIC SIGNATURE SERVICE | REMAINING NUMBER OF USAGES |
|---|---|---|
| ○ | SERVICE A | 20 |
| | SERVICE B | 10 |
| | SERVICE C | 5 |
| - | SERVICE D | 0 |

*106

| SELECTION | FUNCTION |
|---|---|
| - | SIGNATURE URGING FUNCTION |
| | EXPIRATION MANAGEMENT FUNCTION |

FIG. 12

| NUMBER | CONTRACT NUMBER | CONTRACT REQUESTING DESTINATION | CONTRACT DATE | CONTRACT EXPIRATION | STATUS | CONTRACT DOCUMENT | ELECTRONIC SIGNATURE SERVICE | ACTION | RELATED CONTRACT |
|---|---|---|---|---|---|---|---|---|---|
| 1 | 100 | B COMPANY | 04.01.1995 | 04.01.2020 | CONTRACTED | 100.PDF | SERVICE B | RENEWAL OF CONTRACT | - |
| 2 | 101 | C COMPANY | - | 12.31.2030 | IN MIDDLE OF CONTRACT | 101.PDF | SERVICE C | SIGNATURE URGING | - |
| 3 | - | B COMPANY | - | 04.01.2020 | - | 100.PDF | SERVICE B | EDIT | 100 |
| 4 | - | NOT SELECTED | - | NOT WRITTEN | - | NOT WRITTEN | NOT SELECTED | NEW CREATION | - |

Table 102:

| NUMBER | CONTRACT NUMBER | CONTRACT REQUESTING DESTINATION | CONTRACT DATE | CONTRACT EXPIRATION | STATUS | CONTRACT DOCUMENT | ELECTRONIC SIGNATURE SERVICE | ACTION | RELATED CONTRACT |
|---|---|---|---|---|---|---|---|---|---|
| 1 | 100 | B COMPANY | 04.01.1995 | 04.01.2020 | CONTRACTED | 100.PDF | SERVICE B | RENEWAL OF CONTRACT | - |
| 2 | 101 | C COMPANY | - | 12.31.2030 | IN MIDDLE OF CONTRACT | 101.PDF | SERVICE C | SIGNATURE URGING | - |
| 3 | - | NOT SELECTED | - | NOT WRITTEN | - | NOT WRITTEN | NOT SELECTED | NEW CREATION | - |

Table 104:

| SELECTION | ELECTRONIC SIGNATURE SERVICE | REMAINING NUMBER OF USAGES |
|---|---|---|
| - | SERVICE A | 20 |
| ☐ | SERVICE B | 10 |
| ☐ | SERVICE C | 5 |
| - | SERVICE D | 0 |

Table 106:

| SELECTION | FUNCTION |
|---|---|
| ○ | SIGNATURE URGING FUNCTION |
| ☐ | EXPIRATION MANAGEMENT FUNCTION |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2021-047980 filed Mar. 22, 2021.

BACKGROUND

(i) Technical Field

The technique of the present invention relates to an information processing apparatus and a non-transitory computer readable medium storing an information processing program.

(ii) Related Art

There is a technology to securely share a contract document.

JP2016-004300A discloses an electronic signature document management system that is a system that appropriately performs an electronic signature on a digitized document among a plurality of users and manages the electronic document to be viewable. The electronic signature document management system includes a plurality of terminals used by the respective users, a management apparatus, a first communication path that is encrypted and connects each of the terminals and the management apparatus to each other, and a second communication path that connects the terminals to each other and connects each of the terminals and the management apparatus to each other. A terminal of a first user transmits data of the digitized document to the management apparatus via the first communication path and transmits a notification of an address of the document in the management apparatus and a signature request to terminals of one or a plurality of second users requesting a signature, via the second communication path. The terminal of the second user receiving the request receives the data of the document via the first communication path, and transmits electronic signature data with confirming the contents of the document via the first communication path. The management apparatus stores the digitized document with the electronic signature at the address via the first communication path to be viewable.

There is a technology of retaining the originality of electronic contracts.

JP2002-099843A discloses a contact support integrated service system that uses a communication terminal, a service providing server, and a communication line connecting the server and the communication terminal to each other to certify "each act in the negotiation process of a contract", an "act of signing for contract conclusion", and a "series of history until contract conclusion" which are made on a communication system such as a communication network, and to safely stores the above acts and the history in a form of data that maintains the readability as high as paper. The contact support integrated service system includes a unit that receives a request of a company or the like that wishes to issue a "program using an encryption technology such as an electronic signature and a key of the program", and stores and issues the "program using an encryption technology such as an electronic signature and the key of the program" in a "device having a function of not allowing physical duplication of the encrypted program or data", and a unit that safely stores contract data signed or authenticated by the "program using an encryption technology such as an electronic signature and the key of the program without being tampered, in order for an in-service authentication station authority certified by a third-party authentication authority that provides a highly reliable certification service to use this service.

SUMMARY

A user who is registered in the electronic signature service and uses the electronic signature service as a contract requesting source can confirm contract information being information regarding a contract using the electronic signature service and service information being information regarding the electronic signature service, by logging in to the electronic signature service.

In a case where the user is registered in a plurality of electronic signature services and uses the electronic signature services, the user is required to separately log in to each electronic signature service in order to check the service contents of each electronic signature service, the use status of each electronic signature service, and the like. After separately checking, for example, in a case where an intended electronic signature service is used in a new contract, the user can finally start creation of the contract by separately logging in to the intended electronic signature service again.

Aspects of non-limiting embodiments of the present disclosure relate to an information processing apparatus and a non-transitory computer readable medium storing an information processing program capable of receiving selection of an intended electronic signature service without separately checking a plurality of electronic signature services in which a user is registered.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to use authentication information of a first user who is registered in a plurality of electronic signature services and uses the electronic signature services, to acquire at least one of contract information regarding a contract using each electronic signature service or service information, from each electronic signature service, the authentication information being provided for each of the electronic signature services and used for using the electronic signature service, and the service information being information regarding each electronic signature service, display a check screen in association with the acquired at least one of the contract information or the service information and the electronic signature service as an acquisition source, the check screen being used for checking the plurality of electronic signature services, and receive selection of the electronic signature service used by the first user on the check screen.

BRIEF DESCRIPTION OF THE DRAWINGS

Exemplary embodiment(s) of the present invention will be described in detail based on the following figures, wherein:

FIG. 7 is a diagram illustrating an example of the check screen used for contract management of the contract management apparatus according to the present exemplary embodiment;

FIG. 9 is a diagram illustrating another example of the check screen used for creating the contract request in the contract management apparatus according to the present exemplary embodiment;

FIG. 10 is a diagram illustrating an example of a check screen used for editing the contract request in the contract management apparatus according to the present exemplary embodiment;

FIG. 12 is a diagram illustrating an example of a check screen used for renewing the contract request in the contract management apparatus according to the present exemplary embodiment; and FIG. 13 is a diagram illustrating still another example of the check screen used for creating the contract request in the contract management apparatus according to the present exemplary embodiment.

DETAILED DESCRIPTION

Figure 1:
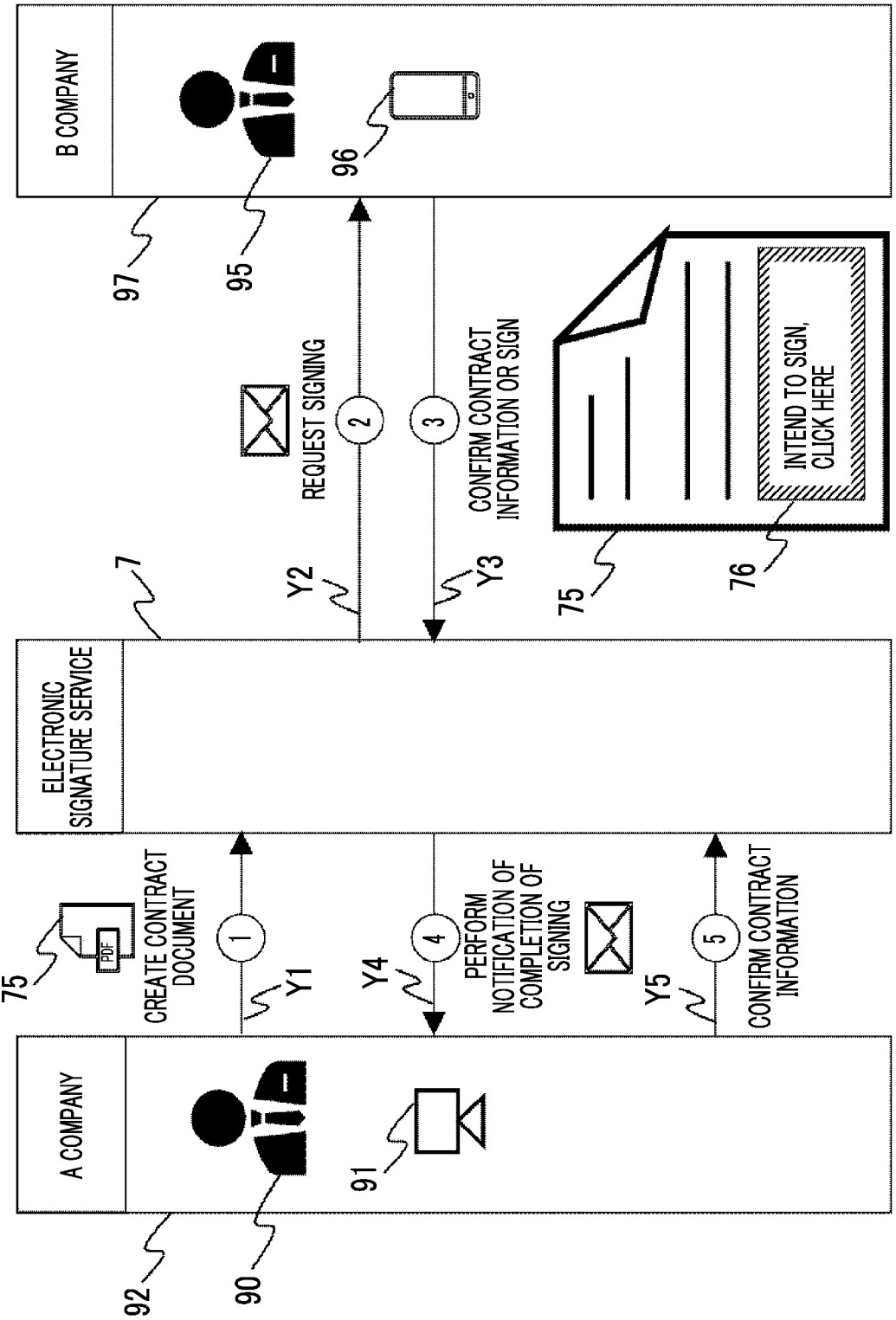
FIG. 1 is a schematic diagram illustrating an electronic signature service.

Hereinafter, exemplary embodiments of the present invention will be described in detail with reference to the drawings. The identical reference signs are denoted by the same or equivalent components and portions in the drawings. In addition, the dimensional ratios in the drawings are exaggerated for convenience of description and may differ from the actual ratios.

FIG. 1 is a schematic diagram illustrating an electronic signature service 7.

The electronic signature service 7 is a service that realizes the conclusion of a contract between a first user 90 being a contract requesting source and a second user 95 being a contract requesting destination, by electronic signature.

Here, the first user 90 belongs to a company A 92 being a tenant. The first user 90 registers and uses the electronic signature service 7 by using a terminal device 91. The terminal device 91 is, for example, a terminal such as a smartphone, a tablet, and a personal computer. The first user 90 is registered in the electronic signature service 7.

The second user 95 belongs to a company B 97 being a tenant. The second user 95 uses the electronic signature service 7 by using a terminal device 96. The terminal device 96 is, for example, a terminal such as a smartphone, a tablet, and a personal computer. The second user 95 may or may not be registered the electronic signature service 7.

A flow in which the first user 90 requests a contract from the second user 95 by using the electronic signature service 7 will be described in order of processes indicated by arrows Y1 to Y5.

The arrow Y1 indicates a flow in which the first user 90 creates a contract document 75 on the electronic signature service 7 by using the terminal device 91. The electronic signature service 7 provides a contract-document creation function to the first user 90 on a WEB screen, for example. The first user 90 creates the contract document 75 by the contract-document creation function provided by the electronic signature service 7. The first user 90 writes an E-mail address of the second user 95 as the contract requesting destination, on the electronic signature service 7. Here, the contract document 75 is, for example, text data or data stored in a portable document format (PDF) format or the like.

The arrow Y2 indicates a flow of a process in which the electronic signature service 7 requests the second user 95 to sign by E-mail. The electronic signature service 7 transmits, for example, an E-mail in which a uniform resource locator (URL) of a WEB site for confirming the contract document 75 and signing is described. The electronic signature service 7 adds meta information such as a signature region 76 to the contract document 75.

The arrow Y3 indicates a flow in which the second user 95 confirms the contract document 75 or signs on the contract document on the electronic signature service 7 by using the terminal device 96. The second user 95 signs on the signature region 76 assigned to the contract document 75, for example. Then, the electronic signature service 7 performs the electronic signature using the signature.

The arrow Y4 indicates a flow of a process in which the electronic signature service 7 notifies the first user 90 of the completion of signing by E-mail. Similarly, the electronic signature service 7 also notifies the second user 95 of the completion of the signing (not illustrated in FIG. 1).

The arrow Y5 indicates a process in which the first user 90 confirms contract information on the electronic signature service 7 by using the terminal device 91. Here, the contract information is information regarding the contract and includes one or a plurality of items. The contract information includes, for example, the contract status, the contract requesting source, the contract requesting destination, the contract date, the contract expiration, the contract document, or contract-document meta information of the contract. Here, the contract status indicates the conclusion status of the contract. The contract status is, for example, being unrequested, contract-in-progress, or being contracted. The contract-document meta information is information attached to the contract document. The contract-document meta information is, for example, PDF meta information that can be edited before conclusion of a contract, such as the signature region 76, an input box of the amount of money, or a consent check box.

As described above, the electronic signature service 7 provides the first user 90 with the management function including a contract information confirmation function. The management function includes, for example, a function of allowing use of contract information, a function of confirming the previous contract, and a function of renewing the contract. Here, the function of allowing use refers to transmission of information to the user, or causing the information to be in a viewable state or a downloadable state.

On the other hand, the electronic signature service 7 does not provide the second user 95 with the management function. Alternatively, the electronic signature service 7 provides the second user with the management function limited as compared with the first user 90.

For example, the electronic signature service 7 allows the first user 90 to use the contract-document meta information before and after the signing. On the other hand, the electronic signature service 7 does not allow the second user 95 to use the contract-document meta information before and after the signing.

For example, the electronic signature service 7 allows the first user 90 to use contract information of the previous contract with the second user 95. On the other hand, the electronic signature service 7 does not allow the second user 95 to use contract information of the previous contract with the first user 90.

Figure 2:
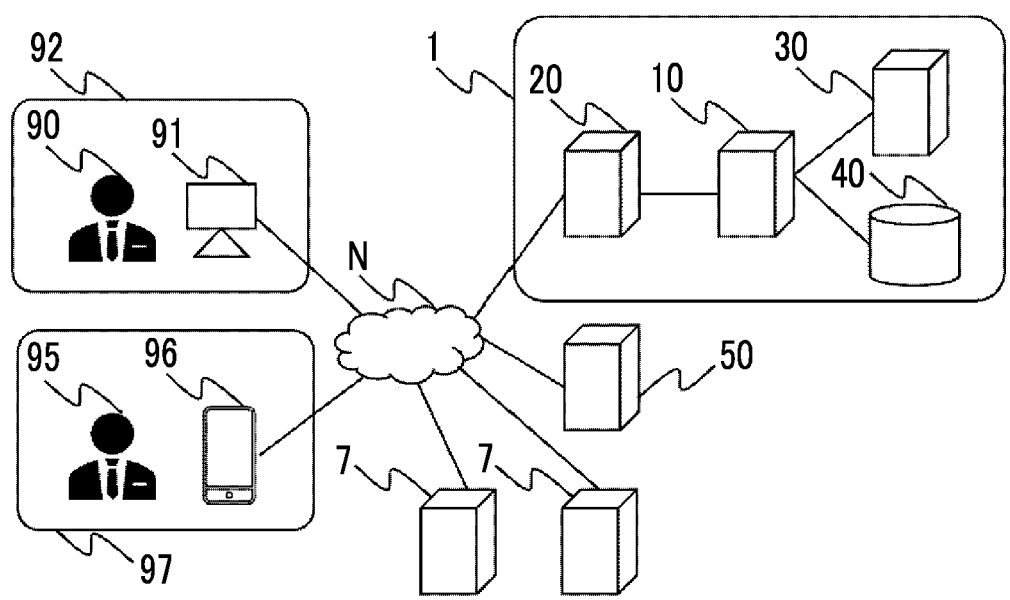
FIG. 2 is a diagram illustrating a system configuration of a contract management system according to an exemplary embodiment.

FIG. 2 is a diagram illustrating a system configuration of a contract management system 1 according to an exemplary embodiment.

The contract management system 1 is a system that acquires at least one of contract information or service information from one or a plurality of electronic signature services 7 and centrally manages contracts. The service information is information regarding the electronic signature service 7. The service information is, for example, the remaining number of usages, which is the number of times that a contract can be requested on the electronic signature service 7, whether or not the electronic signature service is registered, and the expiration date of the authentication information. The remaining number of usages may be the remaining number for the usage limit determined by the electronic signature service 7. In the following description, the contract information and the service information will be referred to as "contract information and the like".

Here, the contract management system 1 is configured by a contract management apparatus 10, a WEB server 20, a contract document storage 30, and a contract management database 40.

The contract management apparatus 10 acquires contract information and the like from one or a plurality of electronic signature services 7. The contract management apparatus 10 displays the acquired contract information and the like on a check screen 100. The check screen 100 is a screen for checking the electronic signature service 7. The check screen 100 will be described later with reference to FIGS. 7 to 13. The contract management apparatus 10 operates as an information processing apparatus in the present disclosure.

The WEB server 20 is a server that transmits and receives to and from a WEB browser or the like by the hypertext transfer protocol (HTTP). The WEB server 20 receives an HTTP request transmitted from the WEB browser installed on the terminal device 96, for example. The WEB server 20 transmits information on the received HTTP request to the contract management apparatus 10.

The contract document storage 30 is a storage that stores files such as the contract document 75. A file is transmitted in response to a request from the contract management apparatus 10 or the like.

The contract management database 40 is a database that stores information used for contract management.

The contract management system 1, the mail server 50, the electronic signature service 7, the company A 92, and the company B 97 are connected to a network N.

The mail server 50 is a mail server that transmits and receives E-mails.

Figure 3:
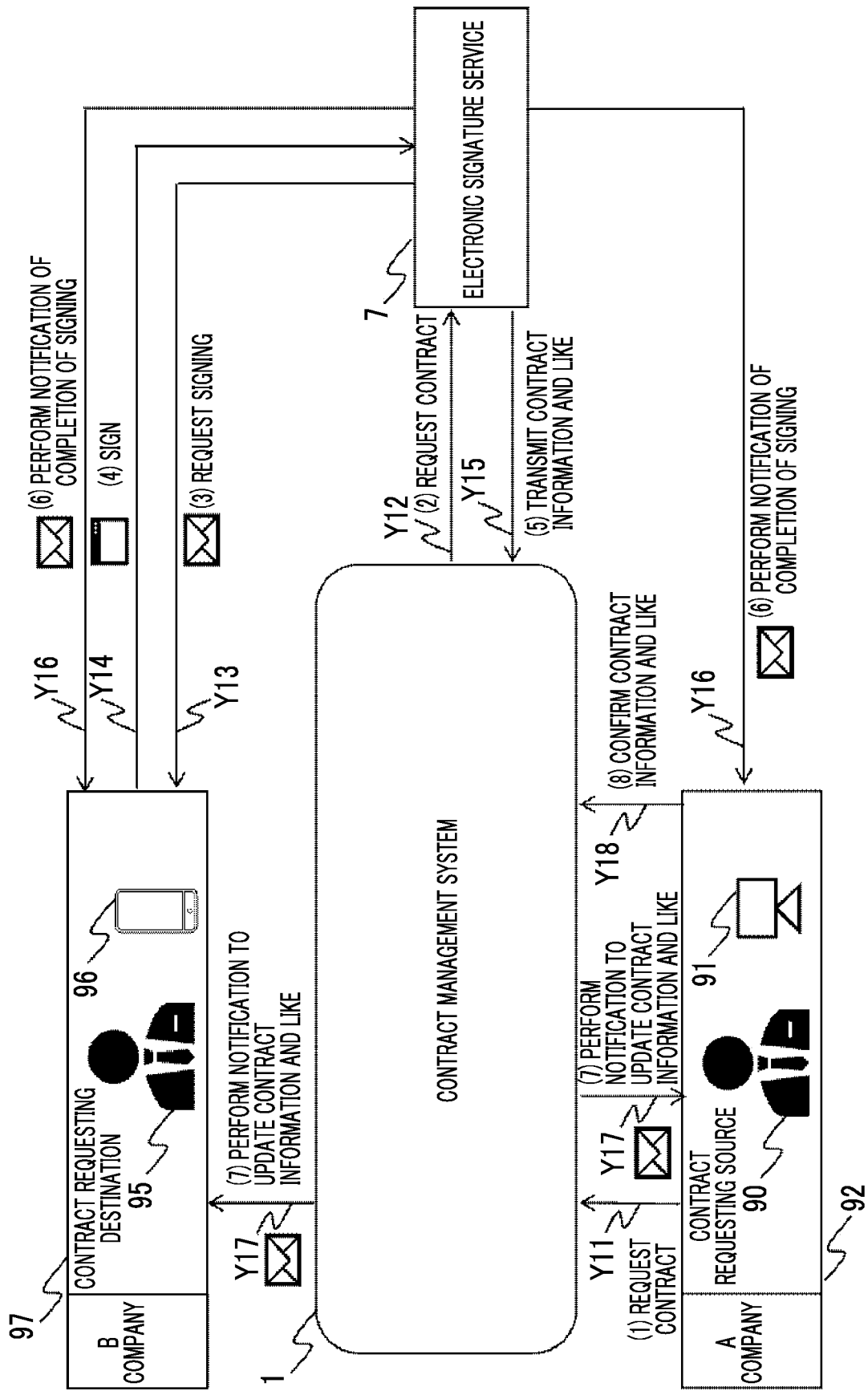
FIG. 3 is a schematic diagram illustrating the contract management system according to the present exemplary embodiment.

FIG. 3 is a schematic diagram illustrating the contract management system 1 according to the present exemplary embodiment.

A flow in which the first user 90 requests a contract from the second user 95 by using the contract management system 1 will be described in order of processes indicated by arrows Y11 to Y18.

The arrow Y11 indicates a flow in which the first user 90 requests a contract with the second user 95 from the contract management system 1 by using the terminal device 91.

The arrow Y12 indicates a flow of a process in which the contract management system 1 requests the contract from the electronic signature service 7. Here, in a case where the electronic signature service 7 opens an application programming interface (API) to the public, the contract management system 1 requests the contract from the electronic signature service 7 by using the API. The electronic signature service 7 executes the API using the authentication information of the first user 90. Here, the authentication information is authentication information for using the electronic signature service 7. The authentication information is, for example, a password or an authentication key for using the API of the electronic signature service 7. The contract management apparatus 10 stores the authentication information of the first user 90 in the contract management database 40 in advance. The process of requesting a contract will be described later with reference to FIG. 6.

The arrow Y13 indicates a flow of a process in which the electronic signature service 7 requests the second user 95 to sign.

The arrow Y14 indicates a flow of a process in which the second user 95 signs on the electronic signature service 7.

The arrow Y15 indicates a flow of a process in which the electronic signature service 7 transmits contract information and the like to the contract management system 1. That is, the contract management system 1 acquires the contract information and the like from the electronic signature service 7. In a case where the electronic signature service 7 opens the API to the public, the contract management system 1 uses the API to acquire the contract information and the like from the electronic signature service 7. The process of acquiring the contract information and the like will be described later with reference to FIG. 5.

The arrow Y16 indicates a flow of a process in which the electronic signature service 7 notifies the first user 90 and the second user 95 of the completion of the signing.

The arrow Y17 indicates a flow of a process in which the contract management system 1 notifies the first user 90 and the second user 95 of the update of the contract information and the like. The update of the contract information and the like is the update of the contract status by signing of the second user 95, for example.

The arrow Y18 indicates a flow in which the first user 90 confirms the contract information and the like on the contract management system 1 by using the terminal device 91.

Figure 4:
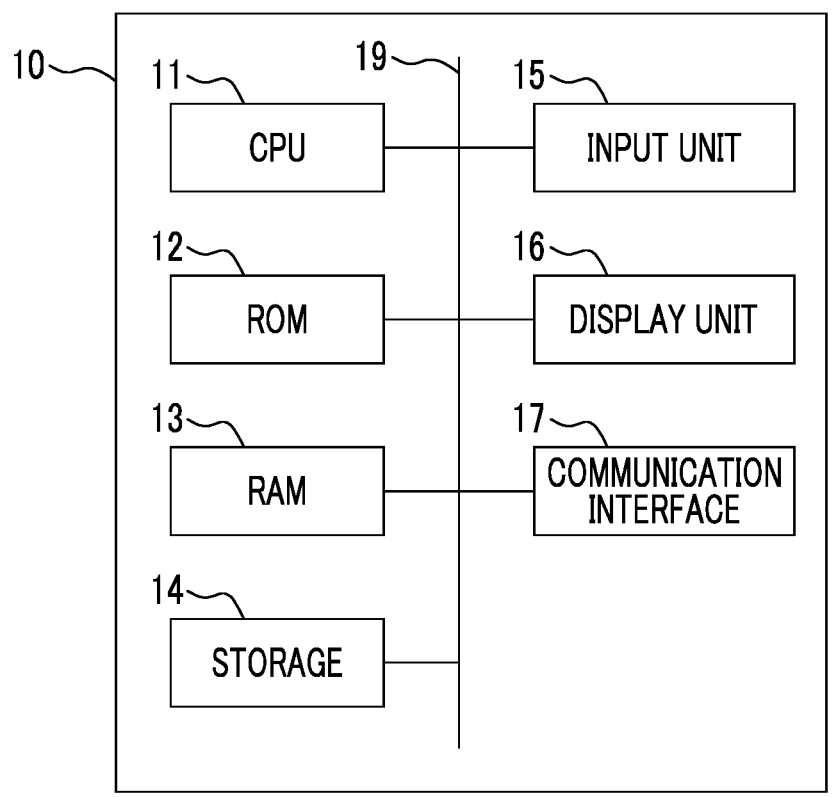
FIG. 4 is a block diagram illustrating a hardware configuration of a contract management apparatus according to the present exemplary embodiment.

FIG. 4 is a block diagram illustrating a hardware configuration of the contract management apparatus 10 according to the present exemplary embodiment. The contract management apparatus 10 includes components such as a central processing unit (CPU) 11, a read only memory (ROM) 12, a random access memory (RAM) 13, a storage 14, an input unit 15, a display unit 16, and a communication interface (communication I/F) 17. The components are connected to each other via a bus 19 to be communicable with each other.

The CPU 11 is a central arithmetic processing unit that executes various programs and controls the units. That is, the CPU 11 reads the program from the ROM 12 or the storage 14, and executes the program using the RAM 13 as a work area. The CPU 11 controls the above components and performs various arithmetic processes, in accordance with the program recorded in the ROM 12 or the storage 14. In the present exemplary embodiment, an information processing program for managing a contract is stored in the ROM 12 or the storage 14. A contract management processing program will be described later with reference to FIGS. 5 and 6.

The ROM 12 stores various programs and various types of data. The RAM 13 temporarily stores the program or the data as a work area. The storage 14 is configured by a hard disk drive (HDD) or a solid state drive (SSD), and stores various programs including an operating system and various types of data.

The input unit 15 includes a pointing device such as a mouse, and a keyboard, and the input unit is used for performing various inputs.

The display unit 16 is, for example, a liquid crystal display and displays various types of information. The display unit 16 may adopt a touch panel type and function as the input unit 15.

The communication interface 17 is an interface for communicating with other devices such as a database. For example, standards such as Ethernet (registered trademark), FDDI, and Wi-Fi (registered trademark) are used for the communication interface.

Next, the operation of the contract management apparatus 10 will be described.

Figure 5:
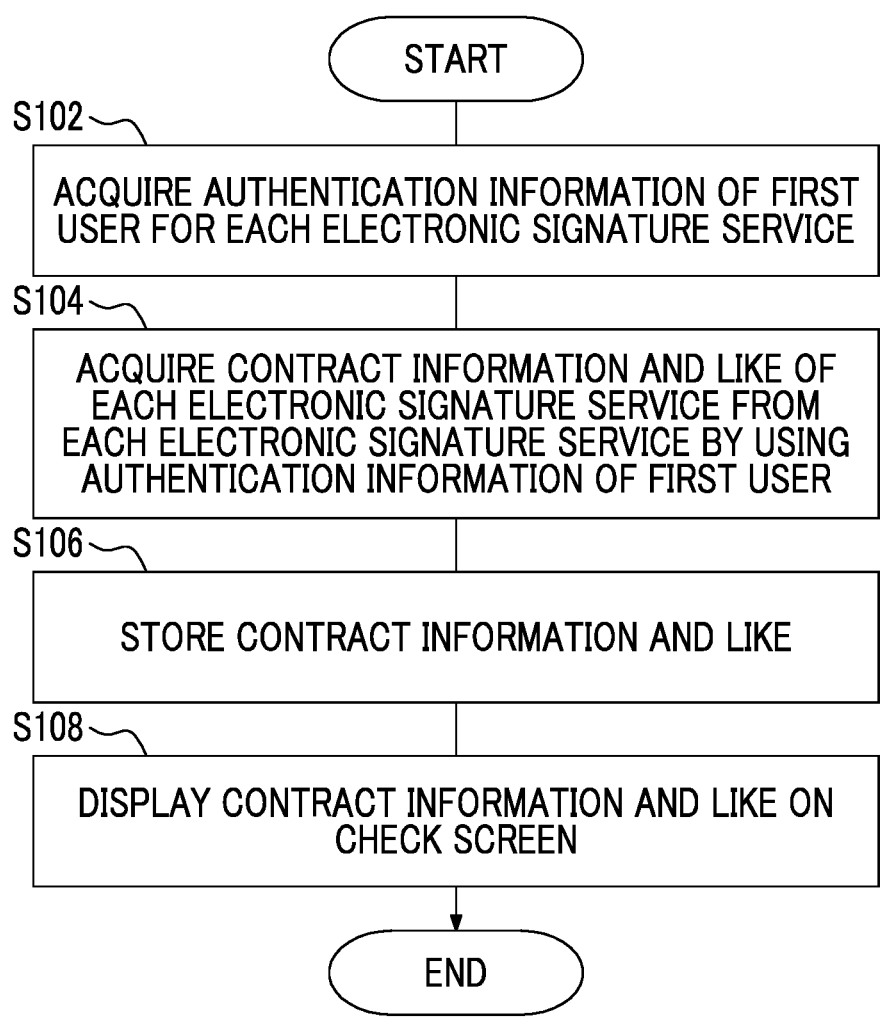
FIG. 5 is a flowchart illustrating a flow of a process of displaying a check screen of the contract management apparatus according to the present exemplary embodiment.

FIG. 5 is a flowchart illustrating a flow of a process of displaying the check screen 100 by the contract management apparatus 10 according to the present exemplary embodiment. The CPU 11 reads a processing program for displaying the check screen 100 from the ROM 12 or the storage 14, and expands the program into a RAM 13, and thus the process of displaying the check screen 100 is performed. A specific example of the check screen 100 will be described later in FIGS. 7 to 13.

In Step S102, the CPU 11 acquires authentication information of the first user 90 for each electronic signature service 7. That is, the CPU 11 acquires one or a plurality of pieces of the authentication information of the first user 90, which are stored in advance in the contract management database 40. The CPU 11 causes the process to proceed to Step S104.

In Step S104, the CPU 11 acquires the contract information and the like of each electronic signature service 7 from each electronic signature service 7 by using the authentication information of the first user 90. The CPU 11 causes the process to proceed to Step S106.

In Step S106, the CPU 11 stores the contract information and the like. That is, the CPU 11 stores the contract information and the like in the contract management database 40. The CPU 11 causes the process to proceed to Step S108.

The processes of Steps S102 to S106 are performed by using the authentication information of a user other than the first user 90. In this manner, the contract information and the like of the user other than the first user 90 are accumulated in the contract management database 40.

In Step S108, the CPU 11 displays the contract information and the like on the check screen 100. Then, the CPU 11 displays the check screen 100 on the display unit 16. The CPU 11 ends the process of displaying the check screen 100.

Figure 6:
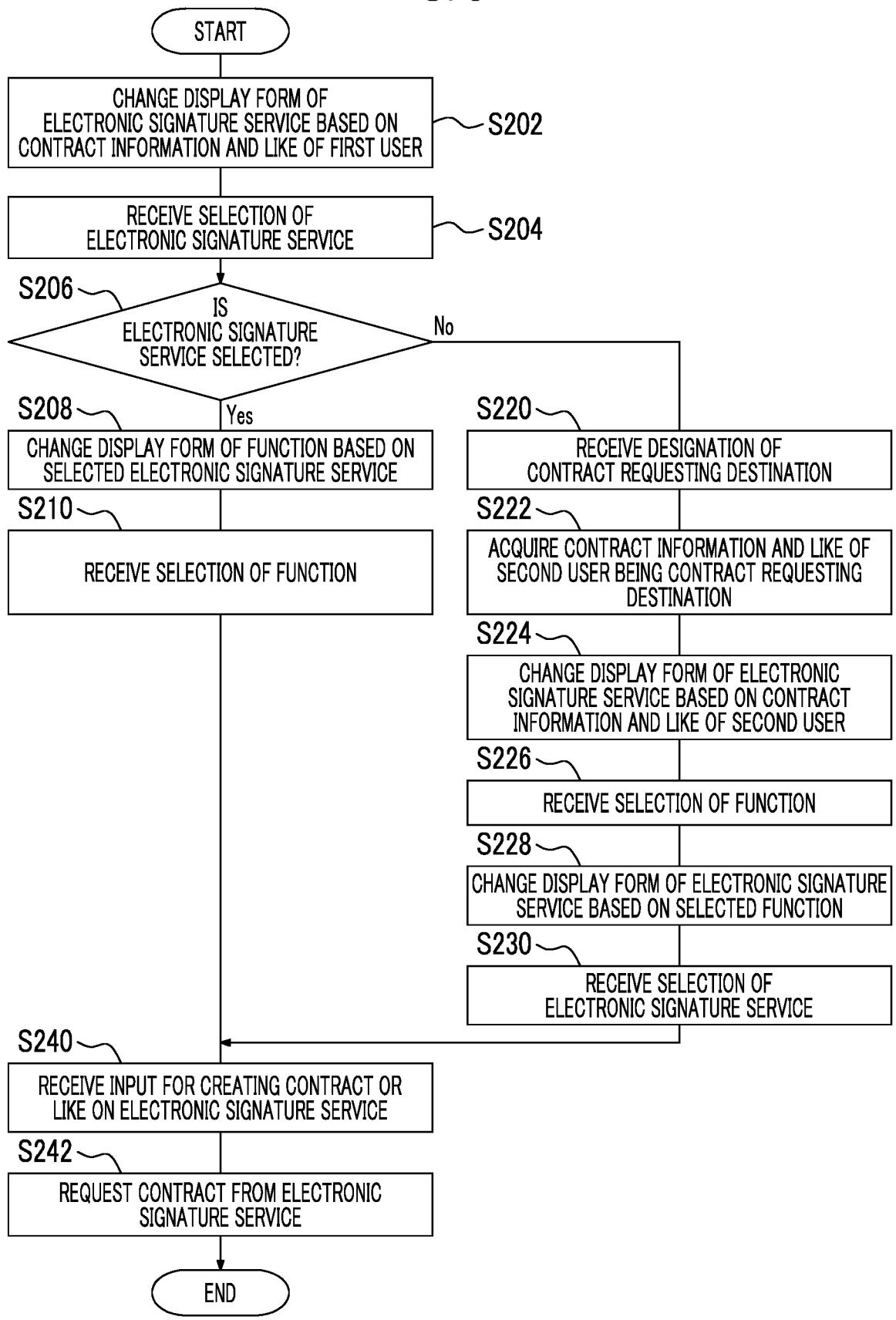
FIG. 6 is a flowchart illustrating a flow of a process of changing a display form of the contract management apparatus according to the present exemplary embodiment.

FIG. 6 is a flowchart illustrating a flow of a process of changing a display form by the contract management apparatus 10 according to the present exemplary embodiment. The CPU 11 reads a processing program for changing the display form from the ROM 12 or the storage 14, and expands the program into a RAM 13, and thus the process of changing the display form is performed. The change of the display form is, for example, switching of whether or not the display is performed, switching of whether or not the selection is possible, a change of a color such as grayout, a change of an order, highlighting in bold, and the like.

When displaying the check screen 100 or when an action described later is selected, the contract management apparatus 10 performs the process of changing the display form.

In Step S202, the CPU 11 changes the display form of the electronic signature service based on the contract information and the like of the first user 90. A specific example of changing the display form of the electronic signature service will be described later in FIGS. 8 and 9. A specific example of the display form of the electronic signature service is an electronic signature service display region 104, which will be described later. The CPU 11 causes the process to proceed to Step S204.

In Step S204, the CPU 11 receives the selection of the electronic signature service. The CPU 11 causes the process to proceed to Step S206.

In Step S206, the CPU 11 determines whether or not the electronic signature service is selected. In a case where it is determined that the electronic signature service is selected (Step S206: Yes), the CPU 11 causes the process to proceed to Step S208. Ina case where it is determined that the electronic signature service is not selected (Step S206: No), the CPU 11 causes the process to proceed to Step S220.

In Step S208, the CPU 11 changes the display form of the function based on the selected electronic signature service. The function is a function provided for the user by the electronic signature service 7. A specific example of changing the display form of the function will be described later in FIG. 10. A specific example of the display form of the function is a function display region 106, which will be described later. The CPU 11 causes the process to proceed to Step S210.

In Step S210, the CPU 11 receives the selection of the function. The CPU 11 causes the process to proceed to Step S240.

In Step S220, the CPU 11 receives the designation of the contract requesting destination. For example, the CPU 11 receives the designation of the contract requesting destination by inputting an E-mail address or being selected from a user list created in advance. The CPU 11 causes the process to proceed to Step S222.

In Step S222, the CPU 11 acquires the contract information and the like of the second user 95 being the contract requesting destination. That is, the CPU 11 acquires the contract information and the like of the contract between the first user 90 and the second user 95, from the contract management database 40. The CPU 11 causes the process to proceed to Step S224.

In Step S222, the CPU 11 may acquire the contract information and the like of the contract in which the second user 95 is the contract requesting source or the contract requesting destination. That is, the CPU 11 acquires the contract information and the like of the contract between a user other than the first user 90 and the second user 95, from the contract management database 40.

In Step S224, the CPU 11 changes the display form of the electronic signature service based on the contract information and the like of the second user 95. A specific example of changing the display form of the electronic signature service will be described later in FIG. 11. The CPU 11 causes the process to proceed to Step S226.

In Step S226, the CPU 11 receives the selection of the function. The CPU 11 causes the process to proceed to Step S228.

In Step S228, the CPU 11 changes the display form of the electronic signature service based on the selected function. A specific example of changing the display form of the electronic signature service will be described later in FIG. 13. The CPU 11 causes the process to proceed to Step S230.

In Step S230, the CPU 11 receives the selection of the electronic signature service. The CPU 11 causes the process to proceed to Step S240.

In Step S240, the CPU 11 receives an input for creating a contract or the like on the electronic signature service 7. Creation of a contract is, for example, creation of a new contract, renewal of a contract, or an edit of a contract. A specific example of the input for creating a contract on the electronic signature service 7 will be described later with reference to FIGS. 8 to 13. The CPU 11 causes the process to proceed to Step S242.

In Step S242, the CPU 11 requests the contract request from the electronic signature service 7. That is, the CPU 11 transmits contract request information to the selected electronic signature service 7 by using the authentication information of the first user 90. The contract request information is information for causing the electronic signature service 7 to perform a contract request process. That is, the CPU 11 causes the electronic signature service 7 to perform the contract request processing by using the API. The CPU 11 ends the process of changing the display form.

FIGS. 7 to 13 are examples of the check screen 100 displayed in the display unit 16 of the contract management apparatus 10 according to the present exemplary embodiment. As illustrated in FIG. 9, the check screen 100 has a contract information-and-like display region 102, an electronic signature service display region 104, a function display region 106, and a detailed display region 108. The contract management apparatus 10 may display the display regions in a case where an action described later is selected. The contract management apparatus 10 may display the display regions on the respective screens.

As illustrated in FIG. 7, the contract management apparatus 10 displays the contract information and the like acquired from the electronic signature service 7, in the contract information-and-like display region 102. The contract information-and-like display region 102 includes, for example, a number item, a contract number item, a contract requesting destination item, a contract date item, a contract expiration item, a status item, a contract document item, an electronic signature service item, an action item, and a related contract item.

Here, the electronic signature service item is an item for displaying the electronic signature service 7 which is the acquisition source of the contract information. The contract management apparatus 10 displays the acquired contract information and the electronic signature service 7 as the acquisition source, in association with each other. For example, in a case where the contract management apparatus 10 acquires the contract information having a contract number of 001 from a service B, the contract management apparatus 10 displays the service B in the electronic signature service item.

The action item is an item for displaying an action for causing the electronic signature service 7 to perform a predetermined process. The action is, for example, contract renewal, signature prompting, editing, and new creation. Each action will be described later with reference to FIGS. 8 to 13.

The related contract item is an item for displaying information for specifying a related contract. The related contract item will be described later in FIG. 12.

Figure 8:
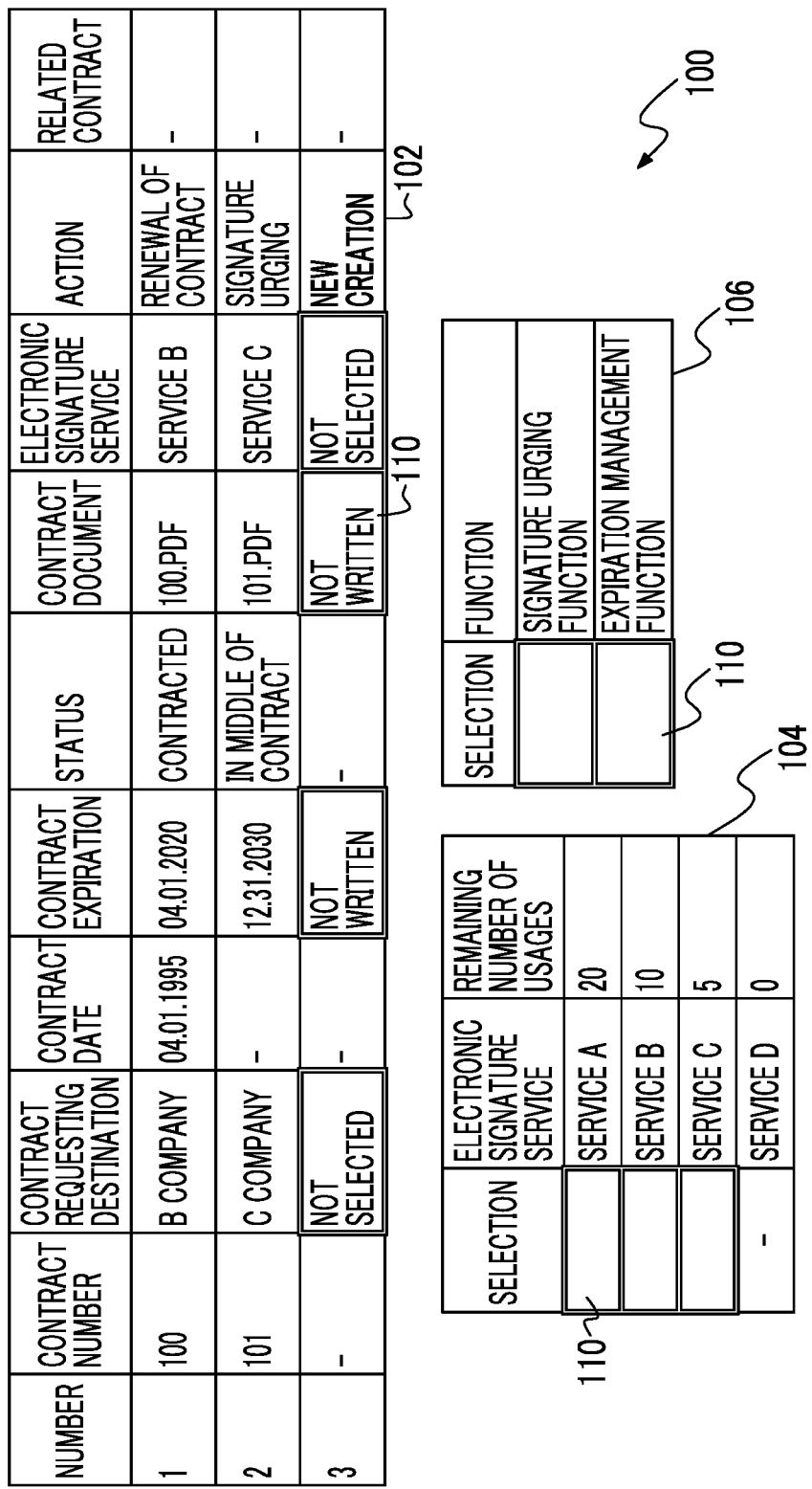
FIG. 8 is a diagram illustrating an example of a check screen used for creating a contract request for the contract management apparatus according to the present exemplary embodiment.

As illustrated in FIG. 8, the contract management apparatus 10 displays one or a plurality of electronic signature services 7 in the electronic signature service display region 104. Then, the contract management apparatus 10 receives the selection of the electronic signature service 7 by the first user 90 from the input box 110. The input box 110 receives the input of a value or the selection of an item. In the present disclosure, the input box 110 is represented by a double-lined square. The electronic signature service display region 104 has an electronic signature service item and a remaining usage count item.

A service A, a service B, a service C, and a service D are displayed in the electronic signature service item.

The remaining usage count item is an item for presenting the remaining number of usages of the first user 90 for each electronic signature service 7. The contract management apparatus 10 displays the remaining number of usages being the acquired service information and the electronic signature service 7 as the acquisition source in association with each other.

As illustrated in FIG. 8, the contract management apparatus 10 displays the function of the electronic signature service 7 in the function display region 106. The functions are, for example, a signature urging function of notifying the contract requesting destination to urge signing and an expiration management function of performing a notification in a case where the contract expiration is within a predetermined period. The contract management apparatus 10 receives the selection of the function by the first user 90 from the input box 110.

The function display region 106 before receiving the selection of the electronic signature service 7 will be described later in FIGS. 8, 9, 11, and 13. The function display region 106 after receiving the selection of the electronic signature service 7 will be described later with reference to FIG. 10.

The detailed display region 108 will be described later with reference to FIG. 9.

FIG. 7 illustrates an example of the check screen 100. In the contract information-and-like display region 102, the contract information and the like acquired from the electronic signature service 7 are displayed. FIG. 7 illustrates the check screen 100 in a state where no action is selected.

FIGS. 8 and 9 illustrate examples of the check screen 100 used for creating the contract request. The contract information of No. 3 is displayed in the contract information-and-like display region 102. The action of No. 3 is a new creation. FIGS. 8 and 9 illustrate the check screens 100 in a state where the new creation of the action is selected. The new creation of the action is a process of creating information for creating a contract on the electronic signature service 7. That is, the new creation is a process of receiving an input for creating a new contract.

FIG. 8 illustrates the check screen 100 on which the input is received on the contract information-and-like display region 102. In a case where the new creation is selected by the user, the contract management apparatus 10 displays the electronic signature service display region 104 and the function display region 106.

For example, in a case where there is an electronic signature service 7 of which the remaining number of usages is equal to or smaller than a predetermined threshold value, the contract management apparatus 10 prohibits reception of the selection of the electronic signature service in the electronic signature service display region 104. The contract management apparatus 10 prohibits the reception of selection of the service D of which the remaining number of usages is 0, in the electronic signature service display region 104. The contract management apparatus 10 prohibits the reception of selection by, for example, causing the input box 110 to be unselectable or hidden. The contract management apparatus 10 may display a warning in a case where the selection is made, instead of prohibiting the reception of the selection.

FIG. 9 illustrates the check screen 100 that receives an input on the detailed display region 108. In a case where the user selects new creation, the contract management apparatus 10 displays the detailed display region 108. The detailed display region 108 includes the electronic signature service display region 104, the function display region 106, and the item input box 110 for causing the electronic signature service 7 to perform a contract request.

Figure 11:
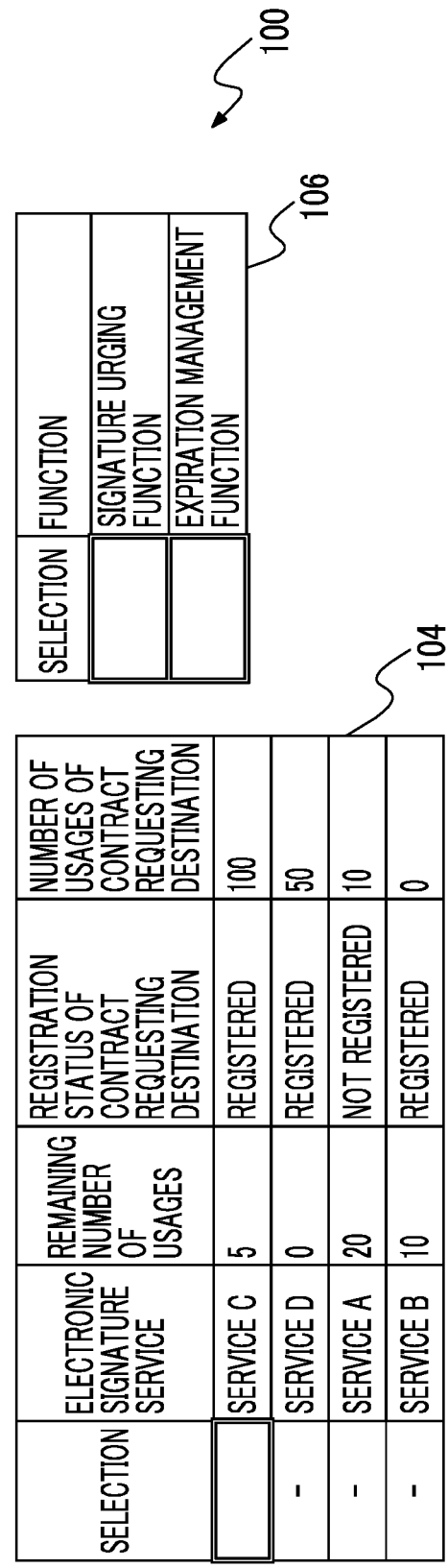
FIG. 11 is a diagram illustrating another example of the check screen used for editing the contract request in the contract management apparatus according to the present exemplary embodiment.

FIGS. 10 and 11 illustrate examples of the check screen 100 used for editing the contract request. In the contract information-and-like display region 102, the request information of contracts of No. 3 and No. 4, which is in the middle of being created is displayed. FIGS. 10 and 11 illustrate the check screens 100 in a state where edition of an action is selected. The edition of an action is a process of editing information for creating a contract on the electronic signature service 7.

FIG. 10 illustrates the check screen 100 for editing a contract request in which the service A is selected as the electronic signature service 7. In the contract information-and-like display region 102, the electronic signature service 7 of the contract information of No. 3 is the service A.

The contract management apparatus 10 changes the display form of the function display region 106 based on the electronic signature service selected in the contract information-and-like display region 102.

For example, in a case where there is a difference between the functions provided by the electronic signature services, the contract management apparatus 10 displays the different function in a display form different from the display form of the common functions. The contract management apparatus 10 determines whether or not the function is common, based on the information of the function provided for each electronic signature service 7, which is stored in advance in the contract management database 40.

For example, in a case where the service A provides the expiration management function and does not provide the signature urging function, the contract management apparatus displays the expiration management function and the signature urging function in the function display region 106 in different display forms. For example, the contract management apparatus displays the expiration management function in a selectable form, and displays the signature urging function in an unselectable form. In this case, the contract management apparatus 10 prohibits reception of the selection, for example, by causing the input box 110 to be unselectable or hidden. The contract management apparatus 10 may display a warning in a case where the selection is made, instead of prohibiting the reception of the selection.

FIG. 11 illustrates the check screen 100 for editing a contract request in which a company D is selected as the contract requesting destination. The contract requesting destination for the contract information of No. 4 is the company D.

The contract management apparatus 10 changes the display form of the electronic signature service display region 104 based on the contract requesting destination selected in the contract information-and-like display region 102.

For example, the contract management apparatus 10 displays a registration status item of the contract requesting destination and a usage count item of the contract requesting destination, in the electronic signature service display region 104.

The registration status item of the contract requesting destination is an item for displaying whether or not the contract requesting destination is registered in the electronic signature service 7, for each electronic signature service 7. Whether or not the electronic signature service 7 is registered is included in the service information. In a case where the authentication information of the contract requesting destination is not stored in the contract management database 40, the contract management apparatus 10 may determine that the electronic signature service 7 is not registered.

The contract management apparatus 10 prohibits reception of the selection of the electronic signature service 7 which is not registered by the contract requesting destination, in the electronic signature service display region 104. For example, the contract management apparatus 10 prohibits the reception of the selection of the service A in which the registration status item of the contract requesting destination is empty in the electronic signature service display region 104.

The usage count item of the contract requesting destination is an item for displaying the number of times of creating the contract which is created by the contract requesting destination on the electronic signature service 7 for each electronic signature service 7. The contract management apparatus 10 displays the acquired contract information and the electronic signature service 7 as the acquisition source, in association with each other. For example, the contract management apparatus 10 acquires the contract information between the first user 90 and the company D being the contract requesting destination, from the contract management database 40 for each electronic signature service 7. Then, the contract management apparatus displays the number of contracts in the electronic signature service display region 104. The contract management apparatus 10 may use the frequency of use instead of the number of usages. The contract management apparatus 10 displays, for example, the frequency of use, which is the number of usages within one month, in the electronic signature service display region 104.

The contract management apparatus 10 may acquire the number of contracts in which the company D is the contract requesting source or the contract requesting destination, and display the acquired number in the electronic signature service display region 104.

The contract management apparatus 10 displays the electronic signature service used in the previous contract, in a display form different from display forms of other electronic signature services. For example, the contract management apparatus 10 prohibits the reception of selection of the service B of which the number of usages of the contract requesting destination is 0, in the electronic signature service display region 104.

The contract management apparatus 10 displays the electronic signature service items in the electronic signature service display region 104 in descending order of the number of usages of the contract requesting destination.

FIG. 12 illustrates an example of the check screen 100 used for updating the contract request. The contract information having a contract number of 100 is displayed in the contract information-and-like display region 102. The status of the contract information of the contract number 100 is contracted. In a case where the renewal of the contract having a contract number of 100 is selected, the contract management apparatus 10 duplicates the values of the contract requesting destination item, the contract expiration item, the contract document item, the electronic signature service item, and the like. Then, the contract management apparatus 10 displays 100, which is the contract number of the duplication source, in the related contract item.

FIG. 13 illustrates an example of the check screen 100 used for creating the contract request. FIG. 13 illustrates the check screen 100 in a state where the signature urging function of the function display region 106 is selected. The contract management apparatus 10 changes the display form of the electronic signature service display region 104 based on the function selected in the function display region 106. In a case where the service A does not provide the signature urging function, the contract management apparatus 10 prohibits the reception of the selection of the service A in the electronic signature service display region 104.

Hitherto, the contract management apparatus 10 in the present exemplary embodiment has been described above. However, the present disclosure is not limited to the above exemplary embodiment. Various improvements or modifications can be made.

The above processes can also be realized by a dedicated hardware circuit. In this case, the above processes may be performed by one type of hardware or a plurality of types of hardware.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In addition, the program for operating the contract management apparatus 10 may be provided by a computer-readable recording medium such as a universal serial bus (USB) memory, a flexible disk, a CD-ROM (Compact Disc Read Only Memory), or may be provided online via a network such as the Internet. In this case, the program recorded in the computer-readable recording medium is normally transferred into a memory, a storage, or the like and then stored. Further, the program may be provided as independent application software, or may be incorporated into the software of each device as a function of the contract management apparatus 10, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
use authentication information of a first user who is registered in a plurality of electronic signature services and uses the electronic signature services, to acquire at least one of contract information regarding a contract using each electronic signature service or service information, from each electronic signature service, the authentication information being provided for each of the electronic signature services and used for using the electronic signature service, and the service information being information regarding each electronic signature service;
display a check screen in association with the acquired at least one of the contract information or the service information and the electronic signature service as an acquisition source, the check screen being used for checking the plurality of electronic signature services;
receive selection of the electronic signature service used by the first user on the check screen; and
in a case where there is a difference between functions provided by the plurality of electronic signature services, display the function provided by the selected electronic signature service and the function which is not provided by the selected electronic signature service in different display forms, on the check screen on which the selection of the electronic signature service has been received.

2. The information processing apparatus according to claim 1, wherein the processor is configured to:
use the authentication information of the first user for the selected electronic signature service to receive an input for creating the contract on the selected electronic signature service.

3. An information processing apparatus, comprising a processor configured to:
use authentication information of a first user who is registered in a plurality of electronic signature services and uses the electronic signature services, to acquire at least one of contract information regarding a contract using each electronic signature service or service information, from each electronic signature service, the authentication information being provided for each of the electronic signature services and used for using the electronic signature service, and the service information being information regarding each electronic signature service;
display a check screen in association with the acquired at least one of the contract information or the service information and the electronic signature service as an acquisition source, the check screen being used for checking the plurality of electronic signature services;
receive selection of the electronic signature service used by the first user on the check screen; and
in a case where there is a difference between functions provided by the plurality of electronic signature services, and selection of the function is received on the check screen before the selection of the electronic signature service is received, display the electronic signature service that provides the function and the electronic signature service that does not provide the function, in different display forms.

4. The information processing apparatus according to claim 2, wherein the processor is configured to:
in a case where there is a difference between functions provided by the plurality of electronic signature services, and selection of the function is received on the check screen before the selection of the electronic signature service is received, display the electronic signature service that provides the function and the electronic signature service that does not provide the function, in different display forms.

5. The information processing apparatus according to claim 1, wherein the processor is configured to:
in a case where there is a difference between functions provided by the plurality of electronic signature services, and selection of the function is received on the check screen before the selection of the electronic signature service is received, display the electronic signature service that provides the function and the electronic signature service that does not provide the function, in different display forms.

6. The information processing apparatus according to claim 1, wherein the processor is configured to:
present a remaining number of usages of each electronic signature service on the check screen.

7. The information processing apparatus according to claim 2, wherein the processor is configured to:
present a remaining number of usages of each electronic signature service on the check screen.

8. The information processing apparatus according to claim 6, wherein the processor is configured to:
prohibit reception of the selection of the electronic signature service in which the remaining number of usages is equal to or smaller than a predetermined threshold value.

9. The information processing apparatus according to claim 1, wherein the processor is configured to:
change a display form between the plurality of electronic signature services displayed on the check screen, depending on the acquired at least one of the contract information or the service information.

10. The information processing apparatus according to claim 9, wherein the processor is configured to:
acquire the contract information, and
in a case where a second user as a contract requesting destination of a new contract is included as a contract requesting destination of a previous contract included in the contract information, display the electronic signature service used in the previous contract on the check screen in a display form different from a display form of other electronic signature services.

11. The information processing apparatus according to claim 10, wherein the processor is configured to:
in a case where the previous contract of the second user as the contract requesting destination is created by a plurality of electronic signature services, display the electronic signature services on the check screen in descending order of the number of creations.

12. The information processing apparatus according to claim 10, wherein the processor is configured to:
in a case where the selection of the electronic signature service in which the previous contract of the second user as the contract requesting destination is not created is received, issue a warning.

13. The information processing apparatus according to claim 1, wherein the processor is configured to:
use authentication information of a third user other than the first user to further acquire contract information regarding a contract using each electronic signature service, from each electronic signature service, the authentication information being provided for each electronic signature service, and
display the electronic signature service in which the third user as a contract requesting destination of a new contract is registered, and which is used by the third user, on the check screen in a display form different from a display form of the electronic signature service which is not used by the third user.

14. The information processing apparatus according to claim 13, wherein the processor is configured to:
display the electronic signature service in which the third user is registered, and which is used by the third user, on the check screen in order of a use frequency.

15. A non-transitory computer readable medium storing an information processing program causing a computer to execute a process comprising:
using authentication information of a first user who is registered in a plurality of electronic signature services and uses the electronic signature services, to acquire at least one of contract information regarding a contract using each electronic signature service or service information, from each electronic signature service, the authentication information being provided for each of the electronic signature services and used for using the electronic signature service, and the service information being information regarding each electronic signature service;
displaying a check screen in association with the acquired at least one of the contract information or the service information and the electronic signature service as an acquisition source, the check screen being used for checking the plurality of electronic signature services;
receiving selection of the electronic signature service used by the first user on the check screen; and
in a case where there is a difference between functions provided by the plurality of electronic signature services, displaying the function provided by the selected electronic signature service and the function which is not provided by the selected electronic signature service in different display forms, on the check screen on which the selection of the electronic signature service has been received.

* * * * *